United States Patent [19]
Dixon et al.

[11] Patent Number: 5,102,614
[45] Date of Patent: Apr. 7, 1992

[54] CONTROL ROD HOUSING ALIGNMENT AND REPAIR METHOD

[75] Inventors: Robert C. Dixon, Morgan Hill; Gerald A. Deaver; James R. Punches, both of San Jose; Guy E. Singleton, Fremont; John G. Erbes, San Jose; Henry P. Offer, Los Gatos, all of Calif.

[73] Assignee: General Electric Company, San Jose, Calif.

[21] Appl. No.: 725,703

[22] Filed: Jul. 3, 1991

Related U.S. Application Data

[62] Division of Ser. No. 617,828, Nov. 26, 1990, which is a division of Ser. No. 526,880, May 22, 1990, Pat. No. 5,001,840, which is a division of Ser. No. 295,413, Jan. 10, 1989, Pat. No. 4,954,311.

[51] Int. Cl.$^5$ ............................................. G21C 17/00
[52] U.S. Cl. .................................................. 376/260
[58] Field of Search .................. 376/260, 258, 245; 228/29, 119; 219/60 A; 29/723, 906; 33/502, 533, 543, 544, 412

[56] References Cited

U.S. PATENT DOCUMENTS

4,420,455 12/1983 Qurnell et al. ...................... 376/258
4,704,801 11/1987 Frizot et al. ......................... 376/260

Primary Examiner—Daniel D. Wasil
Attorney, Agent, or Firm—Robert R. Schroeder

[57] ABSTRACT

In a boiling water nuclear reactor having its core, fuel support casting, and control rod guide tubes removed to expose the core plate, a method for the submerged welding repair and replacement of the control rod drive housing at the bottom extremity of the reactor vessel is disclosed. An alignment device registers to a hole in the core plate and its corresponding guide pin. A control rod drive housing mating fixture on the depending extremity of the shaft of the alignment device precisely fits and mates to the top of the control rod drive housing. The alignment device includes cross electronic levels sealed for submersion which levels remotely transfer through attached wiring the precise angularity between the top of the control rod drive housing on one hand and the corresponding and overlying hole in the core plate on the other hand. For the welding repair process herein, a welding cylinder apparatus fits over the depending end of the shaft of the alignment device. This welding cylinder protrudes downwardly and around the control rod drive housing mating to the stub tube through which the control rod drive housing is inserted. In the embodiment here illustrated, a rotating raceway is provided interior of the chamber for permitting TIG welding unit to traverse around a path for weldment defined at the side of the control rod drive housing and at the top of the stub tube.

2 Claims, 5 Drawing Sheets

CONTROL ROD HOUSING ALIGNMENT AND REPAIR METHOD

This is a division of co-pending application Ser. No. 07/617,828 filed 11/26/90, which is a division of application Ser. No. 07/526,880 filed May 22, 1990 (now issued as U.S. Pat. No. 5,001,840 on Mar. 26, 1991), which is a division of application Ser. No. 07/295,413 filed Jan. 10, 1989 (now issued as U.S. Pat. No. 4,954,311 on Sept. 4, 1990).

BACKGROUND OF THE INVENTION

This invention relates to the repair of boiling water nuclear reactors. Specifically, this invention relates to a repair procedure for the welding, repairing or replacing control rod drive housings in stub tubes while effecting the required precise angularity, both the angularity and weld occurring in a remote, submerged environment.

STATEMENT OF THE PROBLEM

Repair and/or replacement of control rod drive housings in boiling water nuclear reactors is sometimes required. For many reasons, such control rod drive housings are some of the most remote and difficult to repair portions of boiling water reactors. In order to understand at least some of these difficulties, three factors will be summarized. First, the assembly of the control rod drive housing and its relation to the other components of the reactor will be set forth. Secondly, the function of the control rod drive housing in supporting the core will be emphasized. Finally, the necessity of the precise alignment for this structural element of the reactor will be set forth.

Regarding the control rod drive housing relative to the rest of the core, it is to be understood that the control rod drive housing is a structural element in that it participates in the core support of the reactor. The reactor is typically a cylindrical vessel. It has a bottom closing dome. This dome is transpierced by vertical stub tubes. There is one stub tube for each control rod drive housing.

The control rod drive housing is a support member for the reactor core. This housing is attached to the so-called stub tube. The control rod drive housing extends upwardly in the range of 6 inches to 4 feet from the bottom of the reactor dome. The control rod drive housing successively supports the overlying control rod guide tube, the fuel support casting. Each in turn supports 4 overlying fuel bundles. Each fuel bundle forms a portion of a core, the core typically being comprised of many fuel bundles (in the order of 500-600).

Naturally, for the repair of the control rod drive housing, all of these supported and overlying components must be removed. However, it is important to remember that when a control rod drive housing is appropriately attached, the attachment must be strong enough for the support of the required and overlying elements.

It will be understood that overlying the control rod drive housing there is a core plate. This core plate is located at the bottom of the reactor core. This core plate has a matrix of precisely located circular openings. One such precisely located circular opening overlies each control rod drive housing and each stub tube. Typically, the control rod drive housing supported guide tube fits through this circular hole and fills the circular hole. Thus, the core plate, in cooperation with the guide tube forms a fluid barrier between the reactor plenum adjacent to the bottom of the reactor vessel and the reactor core wherein the steam generating nuclear reaction occurs.

The core plate and precisely located holes overlying each control rod drive housing also serve an alignment function. Simply stated, the typically square-sectioned fuel bundles are supported in precise vertical alignment between the fuel support castings on the lower end with 4 bundles supported on each casting. An overlying metal lattice known as the "top guide" supports the upper end of all the fuel bundles. By registering the fuel bundles to the core support casting at the bottom and registering the distal upper end of the fuel bundles to the top guide, a precise dimension may be maintained between each of the square sectioned fuel bundles. This precise space dimension, or spacing between the fuel bundles, defines a cruciformed sectioned aperture between all of the fuel bundles. It is into and out of this cruciformed section aperture that the correspondingly cruciform sectioned control rod moves for controlling the nuclear reactor.

In order for the control rod to penetrate the core from below the core into the core, it is necessary that the fuel support casting also define a cruciformed shaped aperture. This complementary cruciformed shaped aperture in the fuel support casting is similarly precisely dimensioned and complementary to the dimension between the overlying fuel bundles.

It will be understood that in reaction controlling penetration of the core, precision movement on the part of the control rods is required. Since the control rod is moved by a drive affixed to the control rod drive housing, the alignment of the housing is imparted to the control rod drive and through the control rod drive to the movement of the control rod. Hence, a control rod drive's place within the control rod drive housing imparts to its control rod the acquired alignment.

It is understood that the control rod is required to make an excursion of approximately 165 inches from a position of storage within the control rod guide tubes to a position of reactor controlling penetration through the fuel support casting. In such penetration, it passes into the interstices between the fuel bundles, absorbs neutrons, and mitigates core reaction. If alignment of the control rod drive housing is not properly made, the control rod drive, as extended, will, with its 165 inch lever arm, leverage the misalignment. Binding between the control rod and the cruciform-shaped aperture in the fuel support casting and the fuel bundles at their enclosing fuel bundle channels can occur.

Idle reactor vessels undergoing an outage must be kept for the most part flooded because of their radioactivity. Typically, the flooding includes flooding of at least the top guide all the way down to the bottom of the reactor vessel. This flooding shields those who work on the reactor from radiation.

It is to be understood that the control rod drive and the stub tube to which it is mounted is at the very bottom of the reactor. This is in the order of 60 feet from the top of the normally flooded top guide.

Thus, the reader can understand the replacement or repair of the control rod drive housing is remote, requires precise alignment, and must be sufficiently rigid to assure reactor support and proper control of the reaction.

Accordingly, this disclosure discloses an apparatus and method for effecting such repair.

SUMMARY OF THE INVENTION

In an uncovered and non-operating boiling water nuclear reactor having its core, fuel support casting, and control rod guide tubes removed to expose the core plate, an apparatus and method for the submerged repair and replacement of the control rod drive housing at the bottom extremity of the reactor vessel is disclosed. The apparatus registers to a single hole in the core plate through the top guide. The apparatus for aligning includes protruding vanes, typically four in number, for mating to holes in the core plate, the holes overlying each control rod drive housing. A shaft extends from the vanes down to the top of the control rod drive housing. One of the vanes fits over and aligns with the alignment pin protruding from the core plate to enable removal and replacement of the alignment device with lower and reproducible angularity to the precise position of the control rod drive housing. All vanes are provided with set screws for contacting the top of the core plate so that upon removal of the alignment device, replacement of the alignment device can occur with precise reproducibility. A control rod drive housing mating fixture on the lower extremity of the shaft precisely fits and mates to the top of the control rod drive housing. The alignment device includes crossed electronic levels sealed for submersion, which levels remotely transfer through attached wiring the precise angularity between the top of the control rod drive housing on one hand and the corresponding and overlying hole in the core plate on the other hand. For the welding repair process herein, a welding cylinder apparatus fits over the lower end of the shaft of the alignment device. This welding cylinder protrudes downwardly and around the control rod drive housing mating to the stub tube through which the control rod drive housing is inserted. A first flexible seal suspended at a constant elevation from the shaft of the alignment tube is gas proof and permits the cylinder to be gas flooded as it is submerged. A second and optional flexible seal can be provided at the bottom of the chamber for attachment to the stub tube. In the embodiment here illustrated, a rotating raceway is provided interior of the chamber for permitting a TIG welding unit to traverse around a path for weldment defined at the side of the control rod drive housing and at the top of the stub tube. Assuming the repair includes the replacement of a control rod drive housing, the apparatus is first used without the welding cylinder to determine the precise angularity of the old control rod drive housing with respect to the overlying hole in the core plate. The old control rod drive housing is then removed and the stub tube plugged. The alignment device with the welding cylinder attached is submerged and flooded with sufficient gas to maintain the interior dry by equal and opposite pressure to the hydrostatic pressure of the water outside. With the cylinder effecting a flexible seal to the shaft of the leveling device at the top, the cylinder is fitted at the bottom over the corresponding stub tube. Thereafter, the control rod drive housing to be inserted is inserted from below the reactor. Once insertion and alignment to the bottom of the control rod drive housing fitting has occurred, welds can be made between the stub tube end and the control rod drive housing side with alignment constantly being monitored. Both sequenced welding and final positioning of the new control rod drive can occur reproducing the precise angularity and elevation of the old control rod drive housing.

OTHER OBJECTS FEATURES AND ADVANTAGES

An object of this invention is to disclose a precision alignment device for aligning the top of a control rod drive housing with respect to a precisely positioned overlying hole in the core plate. According to this aspect, there is provided an elongate depending shaft. The shaft includes at its lower end a fixture for fitting to the top of the control rod drive housing. The shaft includes, adjacent its upper end and even with the core plate, four vanes. These vanes straddle the precisely dimensioned hole in the core plate and center the alignment device in the core plate aperture. To ensure reproducibility, at least one of the vanes is slotted to register to an alignment pin adjacent each aperture in the core plate. Affixed to the shaft are crossed electronic levels. These levels are sealed against the flooded environment and remotely output the precise angularity of the shaft to monitoring personnel. The important alignment function is achieved using the precisely measured angularity, combined with the known length of the tool, to establish the relative horizontal position of the housing with respect to the vertical center line of the core plate hole. Preferably the vanes are equipped with set screws and a length measuring device with respect to the core plate so that the alignment of the control rod drive housing and the overlying hole in the core plate is reproducible with respect to the core plate alone.

A further object of this invention is to disclose a process of measuring the alignment of the top of a control rod drive housing with respect to a hole in the core plate. Specifically, and with all vertical reactor components removed, save and except the core plate and control rod drive housing, the alignment device is passed through the top guide, down through the respective hole in the core plate and to the top of the control rod drive housing. The control rod drive housing mating fixture at the bottom of the depending shaft mates to and fits with the top of the control rod drive housing. At the same time, the vanes mate and fit to the respective overlying hole with one of the vanes imparting precise reproducible angularity by registration to the alignment pin on the core plate. Thereafter, precise measurements of angularity between the top of the control rod drive housing and the hole in the core plate is provided, preferably by the use of set screws and length measurement devices. The elevation of the top of the control rod drive housing can likewise be determined.

An advantage of the disclosed apparatus is that the position of the top of the control rod drive housing is precisely determined with respect to the aperture in the core plate. Consequently, location of the top of the control rod drive housing can be made with reference to the corresponding hole in the core plate only. Because of this reference, repair or replacement of the control rod drive housing can occur with confidence that reproducible alignment will likewise occur.

A further object of this invention is to disclose a welding cylinder for repair or replacement of the control rod drive housing. According to this aspect of the invention, the bottom of the depending shaft on the alignment device supports a cylinder. The cylinder is sealed to the shaft of the alignment device at a flexible seal. The cylinder is flooded with gas, supports remote welding and viewing apparatus, and depends from the alignment device. Preferably, the cylinder has a secondary seal for sealing with respect to the stub tube.

An advantage of the disclosed apparatus is that repair and/or replacement of the control rod drive housing can remotely occur by apparatus lowered with the alignment device. At the same time, the alignment device imparts the required angularity to the top of the control rod drive housing so that the repair or replacement when made duplicates the original housing angularity before the repair or replacement occurred.

A further object of this invention is to set forth a process for the repair and/or replacement of a control rod drive housing. Assuming that the angularity of the control rod drive housing has been previously measured, the welding chamber is affixed to the alignment device. It is flooded with gas sufficient to dispel the water and maintain the chamber dry and lowered past the top guide, through the hole in the core plate, and over the respective stub tube. Once in place, a seal is preferably effected with respect to the stub tube. Once the seal is made, either an in situ control rod drive housing can be repaired, or a new control rod drive housing can be inserted and installed.

An advantage of the combination of the alignment device and the welding chamber is that repair and/or replacement of the control rod drive housing can occur with the required rigidity and angularity for support of the reactor core and the alignment of the insertion of the control rod.

BRIEF DESCRIPTION OF THE DRAWINGS

Other objects, features and advantages of this invention will be more apparent after referring to the following specification and attached drawings in which.

DETAILED DESCRIPTION OF A SPECIFIC EMBODIMENT

By reference to FIG. 1, the environment in which the control rod driving housing alignment and repair apparatus and the method by which alignment and repair of a control rod drive housing may be effectuated will be described.

Figure 1:
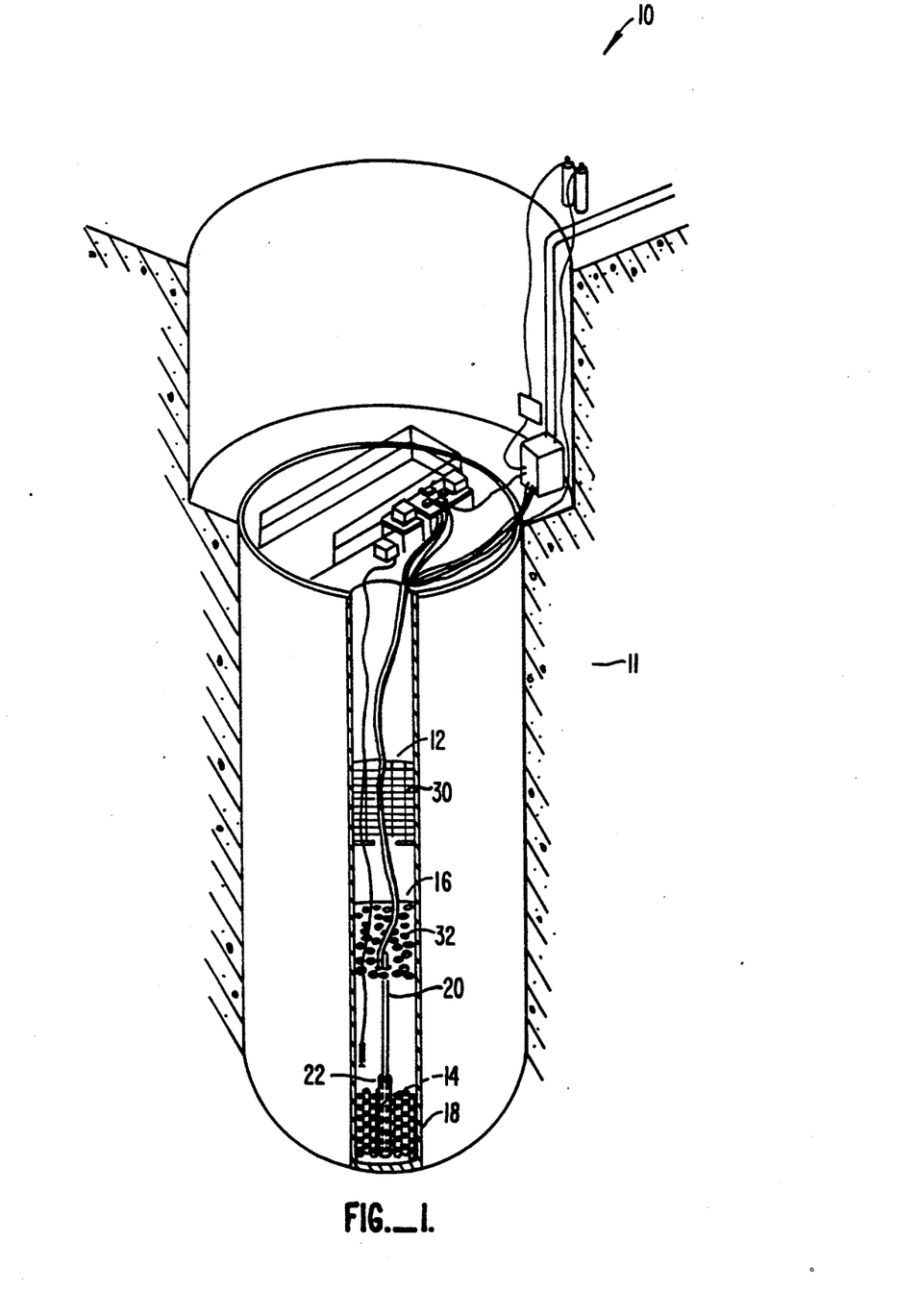
FIG. 1 is a perspective schematic of a reactor vessel with portions of the side wall broken away to show in a schematic fashion the alignment device and welding apparatus of this invention lowered through the core plate and over a stub tube at the bottom of the reactor for effecting the repair herein.

FIG. 1 shows a boiling water nuclear reactor 10 which has been opened for an "outage" in anticipation of operations to be performed on and near the floor of a reactor vessel 11. The nuclear reactor 10 has had its core, fuel element support castings, and control rod guide tubes removed such that a top guide 12 and a core plate 16 are exposed. Water normally fills the reactor vessel 11. Some of the water is left in the reactor vessel 11 and is used to shield workers from exposure to radiation. Desired shielding is provided by maintaining the water to the level of the service platform.

The top guide 12 is a lattice defining a matrix of square apertures 30.

The core plate 16 defines a matrix of circular apertures 32, such that the center of each circular aperture 32 of the core plate 16 is coincident with the center of a corresponding and overlying square aperture 30 in the top guide 12 directly above. In the floor of the reactor vessel 11, there is a matrix of stub tubes 18. The matrix of stub tubes 18 correspond to the overlying matrix of apertures 32 in the core plate 16 and the matrix of square apertures 30 in the top guide 12. This correspondence provides the necessary alignment.

A control rod drive housing 14, shown in phantom lines interior of a welding chamber 22 is inserted through the interior of a stub tube 18 and extends a predetermined distance above the stub tube 18. Attachment of the control rod drive housing 14 to the stub tube 18 is accomplished by welding the inner periphery of the top of the stub tube 18 to the outer surface of the control rod drive housing 14. Alignment of the control rod drive housing 14 in the stub tube 18 to the corresponding aperture 32 in the core plate 16 is accomplished during new construction of the reactor by means of an optical alignment system. The prerequisite that the reactor vessel 11 remain flooded to shield workers from possible radiation exposure prevents the use of optical alignment equipment to align a control rod drive housing 14 during necessary repairs after the reactor 10 has been operated. Accordingly, this disclosure sets forth an alignment system that is useful after initial construction and when the reactor vessel is flooded.

To facilitate the repair of control rod drive housings 14, a housing alignment tool 20 is herein disclosed. The housing alignment tool 20 is lowered through the top guide 12, and becomes immersed in the shielding water which is below the service platform. A lower distal end of the housing alignment tool 20 is passed through an aperture 32 in the core plate 16. The top of the housing alignment tool 20 is registered to the aperture 32 through which the end of the housing alignment tool 20 has been passed.

The lower end of the housing alignment tool 20 is used to measure the position of the top of a control rod drive housing 14 directly below and coincident to the aperture 32. As will hereinafter be set forth, a welding chamber 22 can optionally be provided around the lower distal end of the housing alignment tool 20, such that water is excluded from the interior of the welding chamber 22 which will allow the welding of the control rod drive housing 14 to the stub tube 18.

Figure 2:
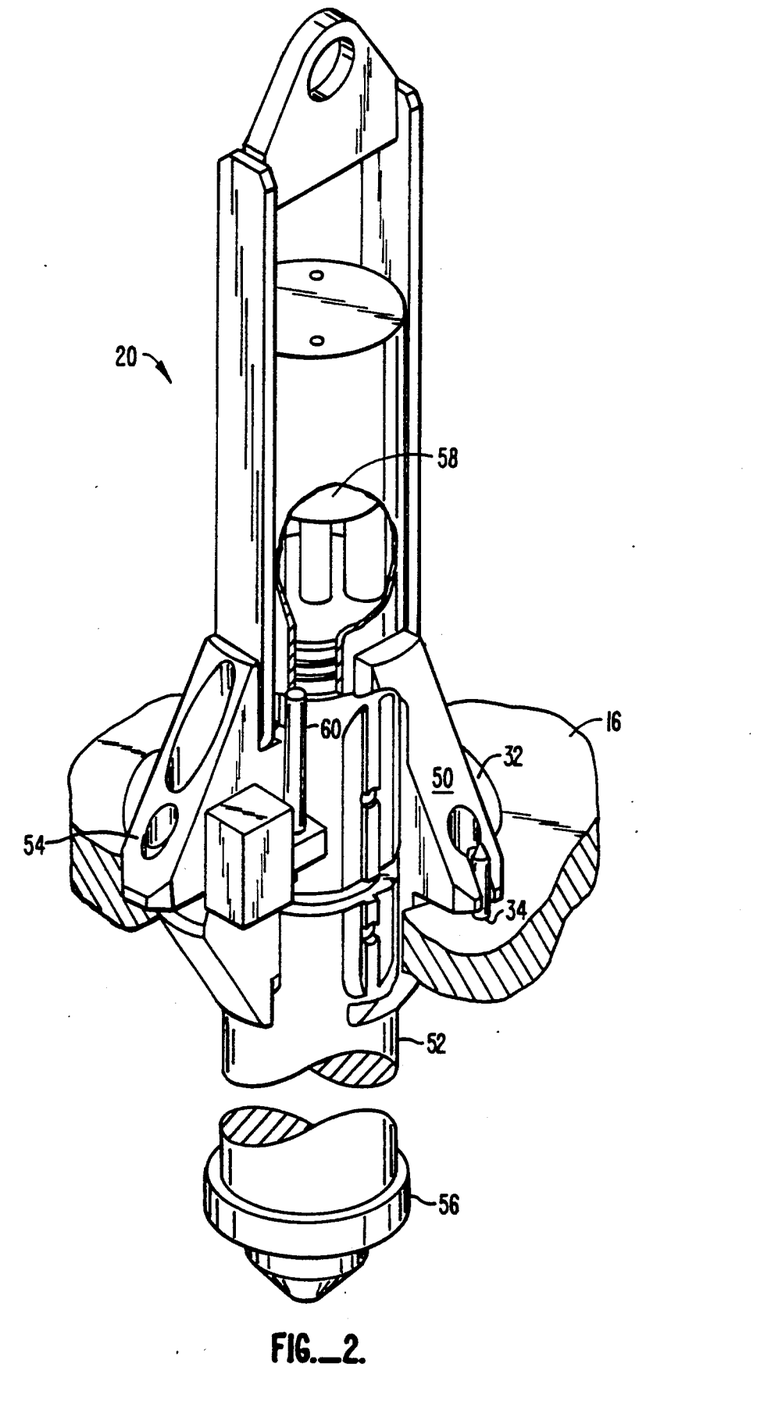
FIG. 2 is an isometric perspective of the alignment device registered to the core plate with the shaft being broken away, the perspective illustrating the overlying orthogonal levels, an elevation measuring device, registration of one of the vanes to the alignment pin in the core plate, and the fixture at the bottom of the shaft for registration to the top of the control rod drive housing.

With the environment of the reactor 10 described, the construction of a housing alignment tool 20 may be described by reference to FIG. 2.

Housing alignment tool 20 includes protruding vanes 50 which are preferably four in number for mating to the aperture 32 in core plate 16. The number of vanes 50 required is dependent upon the stability and accuracy desired for the housing alignment tool 20. Four vanes 50 are preferred; at least three vanes are required.

A shaft 52 depends from the vanes 50 and extends down through the core plate 16 proximate to the top of a control rod drive housing 14. One of the vanes 50 registers itself to an alignment pin 34 provided in the core plate 16 for each aperture 32. The alignment of the housing alignment tool 20 with the alignment pin 34 enables removal and replacement of the alignment device with reproducible angularity such that the lower distal end of shaft 52 registers to the top of the control rod drive housing 14.

Each of the vanes 50 is provided with a set screw 54 for contacting the top of the core plate 16 so that upon removal of the housing alignment tool 20, replacement of the housing alignment tool 20 can occur with precise reproducibility. A control rod housing mating fixture 56 is provided on the depending extremity of the housing alignment tool shaft 52 which precisely fits and mates to the top of the control rod drive housing 14.

The housing alignment tool 20 includes crossed horizontal electronic levels 58 which are sealed for submersion. The electric levels 58 remotely transfer through cabling the precise angularity existing between the center of aperture 32 in core plate 16 on one hand and the top of the control rod drive housing 14 which overlies and is coincident to the aperture 32. Provided proximate to one of the vanes 50 is an elevation measuring slide 60 for precisely determining the distance between the top of the control rod drive housing 14 and the top of the core plate 16.

Figure 3:
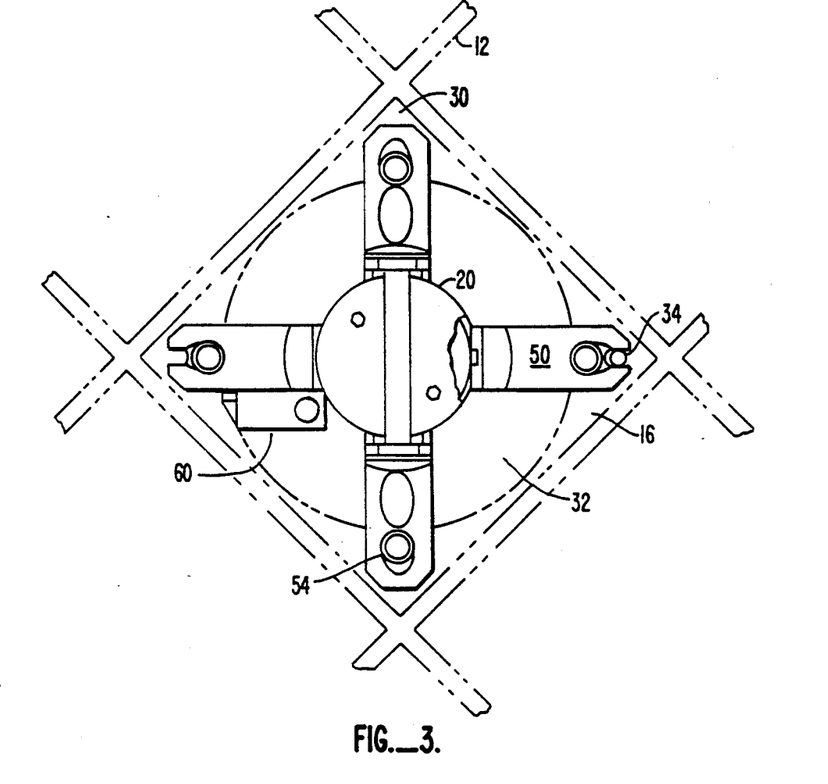
FIG. 3 is a section looking down through the top guide onto the core plate with the alignment device installed, the picture emphasizing the positioning of the vane set screws to the core plate for alignment of the device using the core plate alone as a reference.

By reference to FIG. 3, the positioning of the housing alignment tool 20 may be viewed from above looking through the square aperture 30 in top guide 12. The housing alignment tool 20 has four vanes 50. One of the vanes 50 registers to a core plate alignment pin 34. Shaft 52 (not shown in FIG. 3) which depends from the four vanes 50, is centered in the aperture 32. Four set screws 54, one set screw per vane, are provided which contact the top surface of the core plate 16 and provide reproducible positioning of the housing alignment tool 20. The elevation measuring slide 60 measures the distance between the top of the control rod drive housing 14 and the top of the core plate 16. Precise angularity between the aperture 32 in core plate 16 and an underlying control rod drive housing is obtained.

For the welding repair process herein disclosed, a welding chamber 22 is described with reference to FIGS. 4 and 5. The welding chamber 22 fits over the depending end of the shaft 52 of the housing alignment tool 20. The welding chamber 22 protrudes downwardly and around the end of the housing alignment tool 20. Welding chamber 22 depends beyond housing alignment tool 20 to ultimately surround to the stub tube 18 through which the control rod drive housing 14 is inserted.

A first flexible seal 72 is provided which is a constant distance from the distal end of shaft 52 such that the seal is gas-proof and permits the welding chamber 22 to be gas flooded as it is submerged. A second and optional flexible seal 74 can be provided at the bottom of the welding chamber 22 for attachment to the stub tube 18. The flexibility in seals 72, 74 permits alignment of the welding chamber 22 to conform to required and measured alignments by the horizontally crossed levels.

It is to be noted that the lower inflatable seal 74 is optional. The upper inflatable seal 72 will allow the pressure inside welding chamber 22 to be controlled such that water is excluded from the interior of the welding chamber 22. Such exclusion can occur by constantly balancing the gas pressure inside the welding chamber 22 and the hydrostatic pressure of the water in the reactor vessel 11.

Figure 4:
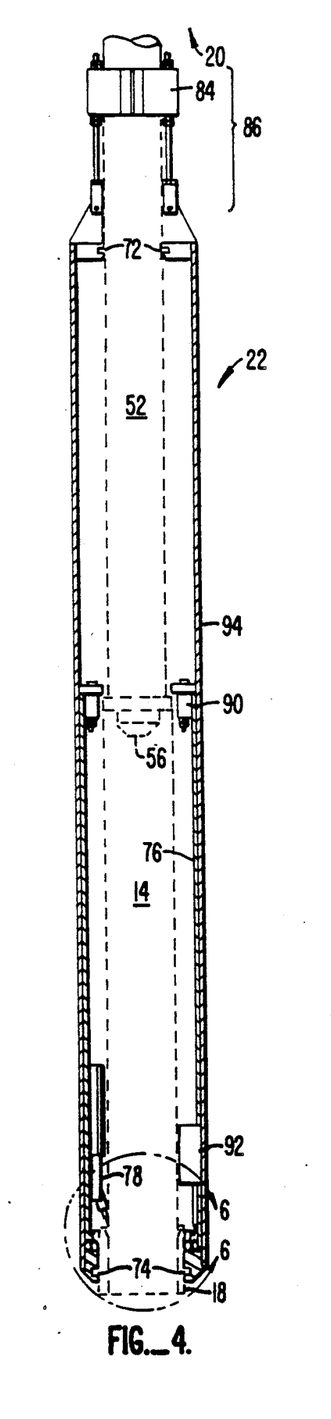
FIG. 4 is a side elevation section of a welding chamber supported at the top by a clamp from the depending shaft of the alignment device, sealed at a flexible seal to the shaft of the alignment device, and including welding apparatus at the bottom thereof for effecting a weld between the side of the control rod drive housing and the top of the stub tube, the chamber here disclosed having a preferably optional seal to mate to the sides of the stub tube.
Figure 5:
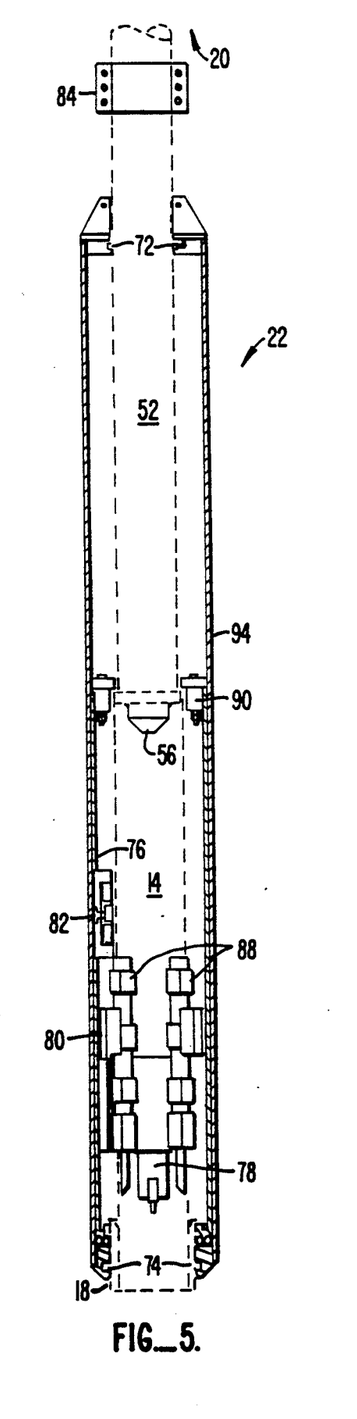
FIG. 5 is a view similar to FIG. 4 illustrating the layout of the standard welding components interior of the cylindrical device.

In the embodiment illustrated in FIGS. 4 and 5, a rotating cylinder 76 is provided interior of the welding chamber 22 to permit TIG (Tungsten inert gas) welding implements to traverse around a path for weldment defined at the side of the control rod drive housing 14 and at the top of the stub tube 18. The welding implements comprise a welding manipulator and torch 78, a wire feed 80, and a wire spool 82. The weldment deposited includes a "J" shaped boundary at the stub tube.

The welding chamber 22 is maintained at a constant elevation with respect to the end of the housing alignment tool 20 and its mating end 56. Such constant elevation is through the use of a split clamp 84 from which hangar rods and clevises 86 are suspended and are attached to the welding chamber 22. The manner by which the welding chamber 22 is attached to shaft 52 allows for flexing of an end of the welding chamber which is proximate to the stub tube 18.

By reference to FIG. 5, it is seen that two television camera assemblies 88 are provided in a fixed relationship to the welding manipulator and torch 78 such that the weldment both before and after the weld may be monitored. Monitoring of the top of the stub tube and welding manipulator and torch 78 during non-welding operations also can occur.

With respect to FIG. 4, a gear motor 92 is provided for attachment to the rotating cylinder 76 interior of welding chamber 22. Gear motor 92 supplies the means for rotating the inner rotating cylinder with respect to the non-rotating outer stationary chamber 94. Additionally, rollers 90 are provided as rough guides to control the movement of the upward end of rotating cylinder 76 with respect to the outer stationery chamber 94 during rotation. The rollers 90 are attached to the inner rotating cylinder 76.

Figure 6:
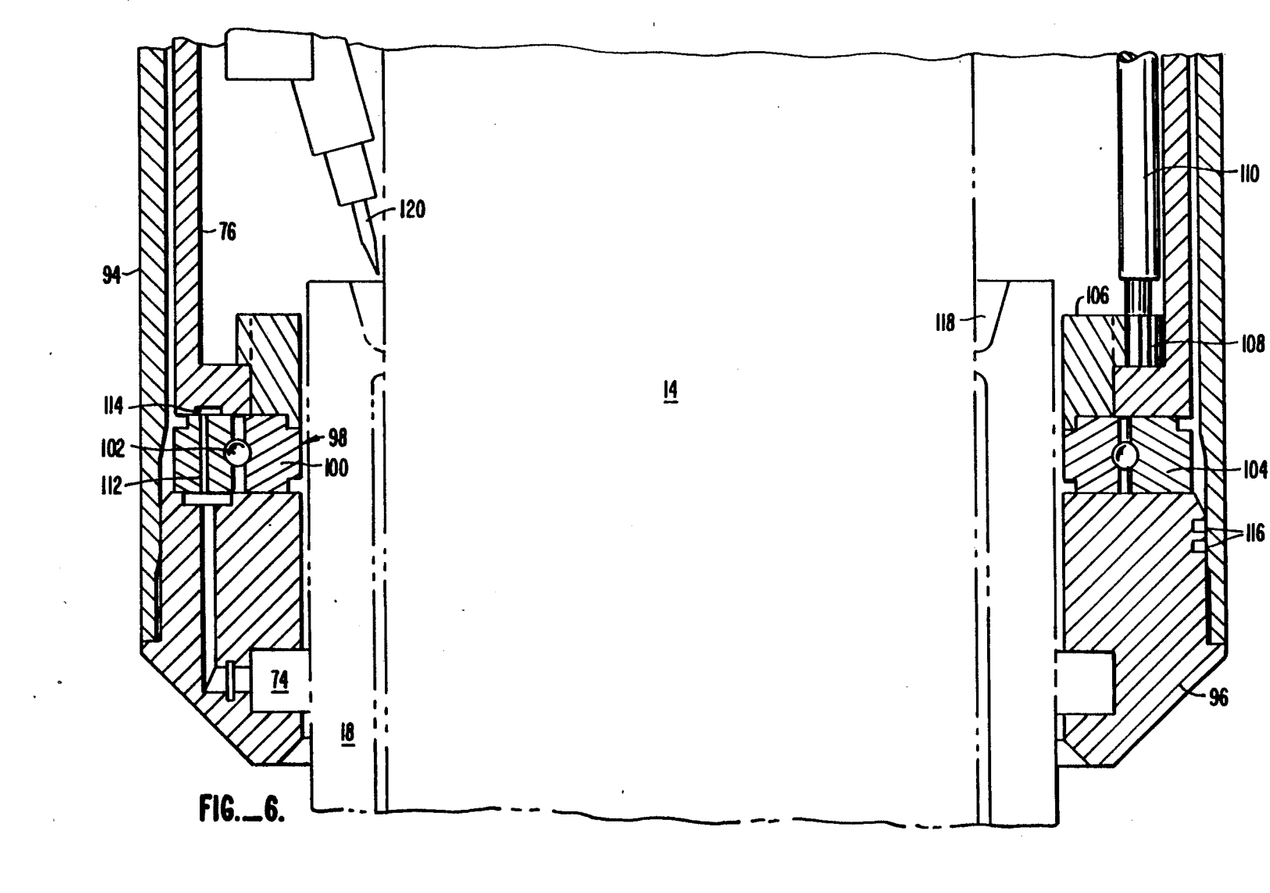
FIG. 6 is a side elevation section of the welding cylinder at the bottom thereof illustrating its seal to the stub tube and setting forth the specific mechanism whereby rotation of the welding head at the weldment groove between the top of the stub tube and the side of the control rod drive housing can occur.

FIG. 4 indicates a detail section taken at the lower end of the welding chamber 22 and its attachment to stub tube 18 which can be described by reference to FIG. 6. FIG. 6 demonstrates the preferred embodiment of attaching welding chamber 22 to stub tube 18 which has a control rod drive housing 14 inserted.

By reference to FIG. 6, a stationary conical piece 96 is provided to mate against stub tube 18. Mounted to the conical nose piece 96 there is a ball bearing 98 having an interior stationary raceway 100 rigidly mounted to the conical nose piece 96. Balls 102 are provided to allow an outer raceway 104 to rotate with respect to the fixed and stationary inner raceway 100. As the housing alignment tool 20 and its depending shaft 52 are stationary with respect to the control rod drive housing 14 inserted through the stub tube 18 to which the conical nose piece 96 is mounted, it will be further appreciated that rotating cylinder 76 rotates with respect to them as well.

As previously described with respect to FIGS. 4 and 5, gear motor 92 is provided for attachment to inner rotating cylinder 76 and to cause the inner rotating cylinder to rotate with respect to the outer stationary chamber 94. The rotation of inner rotating cylinder 76 with respect to the stationary outer cylinder 94 is accomplished by means of a collar gear 106 rigidly attached to the inner raceway 100 of ball bearing 98 and conical nose piece 96. The collar gear 106 extends circumferentially around the perimeter of the stub tube 18. A pinion gear 108 from gear motor 92 is provided for engagement to the collar gear 106. The pinion gear 108 is attached to gear motor 92 via shaft 110. It will be understood that such driven gear shafts are provided with servo control to allow positioning and position determining means to operate. Therefore, the position for any degree of rotation of the rotating cylinder 76 may be determined with respect to the stub tube 18 and control rod drive housing 14.

Additionally provided, for implementation with optional seal 74, is gas pathway 112 and inlet 114. Pathway 112 comprises a series of vertical holes through and around the bearing raceway. Inlet 114 allows pressurized gas to inflate the seal 74 through the bearing raceway. As was previously described, outer raceway 104 of bearing 98 rotates with respect to stationary stub tube 18 and conical nose piece 96. Therefore, the gas pathways 112 are provided in the outer rotating raceway 104 to allow gas to be communicated from passageway 114 to 112 through the rotating raceway 104 and into the inflatable seal 74.

It will be appreciated and understood that if there were no desire to isolate the inner chamber of the welding chamber 22 from the environment, the outer chamber 94 could be removed, and the housing alignment tool 20 and the welding chamber 22 would function without the outer stationary chamber. In the preferred embodiment, the outer stationary cylinder 94 is desired. The reader will also realize that the outer chamber 22 could rotate to effect the rotation desired here.

As will be described hereafter, during the repair of a control rod drive housing 14, successive welds along the side of the control rod drive housing 14 cause it to move and flex. Therefore to provide a seal of the outer stationary chamber 94 with respect to the conical nose piece 96 while permitting the flexing, two O-ring's 116 are provided to seal the outer stationary chamber with respect to the stationary conical nosepiece 96.

Figure 7:
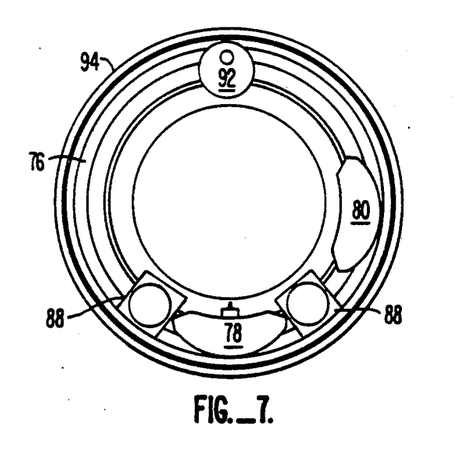
FIG. 7 is a section through the welding cylinder of this invention illustrating component layout at the elevation of the welding head.

Now with respect to FIGS. 7 and 8, the position and relative locations of the welding implements can be described by reference to the respective figures. Note that FIGS. 7 and 8 differ from each other only as to the elevation through which the section is taken. FIG. 7 depicts the stationary outer chamber 94, the inner rotating chamber 76 with the inner rotating chamber 76 showing the gear motor 92, wire feed 80, two television camera assemblies 88 and welding manipulator and torch 78 affixed thereto.

Figure 8:
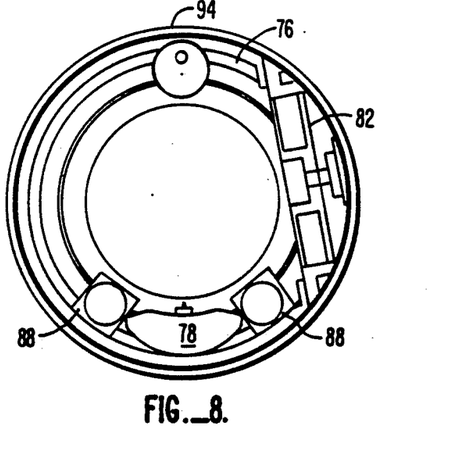
FIG. 8 is a view similar to FIG. 7 taken at the elevation of the center line of the wire-dispensing spool utilized with this invention.

FIG. 8 shows wire spool 82 in relation to the television camera assembly 88 and welding manipulator and torch 78.

In operation, the housing alignment tool 20 is lowered through the top guide 12 and core plate 16. The four vanes 50 fit in the hole in core plate 16 with a specified vane aligning to the alignment pin. The lower distal end of shaft 52 at fixture 56 reproducibly mates with a control rod drive housing 14 which is to be repaired or replaced. By use of the elevation measuring slide 60, the distance between the top of the control rod drive housing 14 and the top of the core plate 16 may be precisely measured. By use of crossed horizontal levels 58, the angularity of the core plate aperture 32 with respect to the top of the control rod drive housing 14 may be precisely measured. By precisely measuring the elevation and the angularity of the aperture 32 in core plate 16, the exact end of the control rod drive housing 14 may be measured with respect to the aperture 32 through which the housing alignment tool is depending.

When repairing the control rod drive housing 14, the existing control rod drive housing has its angularity and elevation precisely measured by use of the housing alignment tool 20. The control rod drive housing 14 is removed from its stub tube 18 and the hole in the reactor vessel 11 floor is plugged pending the installation of a new control rod drive housing 14. When repair is to commence, the housing alignment tool 20 with a welding chamber 22 attached is lowered through the top guide 12 and through an aperture 32 in core plate 16 which is coincident to and overlies the stub tube 18 through which the new control rod drive housing 14 is to be installed. The end of the housing alignment tool 20 at fixture 56 is set at a predetermined location with respect to the pre-measured location of the old control rod drive housing. After the repair operation, the control rod drive housing 14 will be in its precise location, which is the exact location of the old control rod drive housing 14. It will be appreciated that the pressure must be varied and increase as the housing alignment tool 20 with the welding chamber 22 is lowered. The welding chamber 22 is positioned in a predetermined relationship with respect to shaft 52 such that when the end of the alignment tool 56 is in its predetermined position, the lower end of the welding chamber 22 surrounds stub tube 18 such that the welding manipulator and torch 78 may reach the upper periphery of the stub tube 18. If the optional lower secondary seal 74 is utilized, once the welding chamber 22 and the housing alignment tool 20 are positioned correctly, seal 74 may be inflated.

It will be remembered that the housing alignment tool 20 has been positioned on the top of the core plate via four set screws 54 and oriented with respect to alignment pin 34. The plug in the stub tube 18 is removed and a new control rod drive housing 14 is inserted up through the bottom through stub tube 18 and extends up to and abuts mating fixture 56. The correct elevation is reached when the housing alignment tool 20 is lifted off the set screws 54 by the control rod drive housing 14. Next, the angularity of the end of the new control rod drive housing 14 is measured by use of the crossed horizontal levels 58. It is known in the welding art that upon application of a TIG weld, the metal being welded will shrink or expand and the relative angularity of two pieces of metal to be welded will change. Thus the control rod drive housing 14 and the stub tube 18 will fluctuate in their relative angularity, making it difficult to properly position the end of the control rod drive housing 14. Therefore, it will be understood that when in operation the welding manipulator and torch 78 traverse around the periphery of stub tube 18 welding the stub tube 18 to control rod drive housing 14, the angularity of the end of the control rod drive housing as measured by the housing alignment tool 20 will change. However, by use of the crossed horizontal levels 58, the angularity may be monitored. Through selective application of the welds, and proper timing and spacing, it will be understood that upon the completion of the final weld, the top of the control rod drive housing 14 will be exactly and precisely positioned as to angularity and elevation with respect to the aperture 32 in the core plate 16.

In operation of the welding manipulator and torch 78, the television camera assemblies 88 monitor the position of the torch head 120 and the area to be welded. In non-welding applications, light is provided by quartz illumination. When the precise pre-determined location to be welded is reached by rotating the inner cylinder 76 with the welding implements attached, a weld is made.

As before described, the location of the inner rotating cylinder 76 with respect to the stub tube 18 is known through use of a servo-controlled gear motor 92, thus the precise pre-determined location to be welded may be found. As is well known, the welding manipulator 78 allows the location of the tip of the welding torch head 120 to be precisely controlled. Welding is performed via a tungsten arc wherein a mechanical wire feed 80 pulls wire off of a wire spool 82 and feeds it into the arc.

As can be seen in FIG. 6, welding is performed along the upper periphery of the stub tube 18 and the side of the control rod drive housing 14, where a weld prep known as a J-groove 118 has been made. Control of the position of the welding torch head 120 and its angular location about the periphery of the control rod drive housing 14 is accomplished via gear motor 92. Note that due to the relative size of the J-groove 118 at the top of the stub tube 18 and the welding torch head 120, the welding manipulator 78 is sufficiently controllable to perform cross weld oscillation to provide a quality weld and attach the stub tube 18 to the control rod drive housing 14. Thus the new control rod drive housing 14 is attached to the stub tube 18 exactly and as permanently as the old control rod drive housing. The elevation and the angularity of the new control rod drive housing 14 is precisely the same as the old housing, thus the alignment of a control blade in its reaction controlling insertion into the core will be exactly as the old control rod, allowing the reactor 10 to continue to operate as it did before the repair.

While the above provides a full and complete disclosure of the preferred embodiments of the present invention, various modifications, alternate constructions, and equivalence will occur to those skilled in the art given the benefit of this disclosure. Thus, the invention is not limited to the specific embodiments described herein, but as defined by the appended claims.

What is claimed is:

1. A method for underwater welding of a control rod drive housing inserted through a stub tube to maintain requisite alignment and elevation of the top of the control rod drive housing to an overlying and corresponding aperture in a core plate as measured by an alignment device which determines the relative elevation and angularity with respect to the aperture, comprising the steps of:

providing a welding cylinder dependent from the alignment device such that the elevation of the top of the welding cylinder is in a fixed relationship to the alignment device and is gas-proof;

pressurizing the welding cylinder with inert welding gas sufficient to maintain the interior of the welding cylinder dry;

lowering the welding cylinder through said aperture in said core plate by depending said cylinder with respect to said alignment device, said lowering including lowering through and adjusting the elevation relationship of the welding cylinder to the alignment device such that when the alignment device is in position to measure the elevation and angularity of the new control rod drive housing, the lower distal end of the welding cylinder extends below the upper periphery of the stub tube where welding is to occur;

inserting a new control rod drive housing through the stub tube and positioning the control rod drive housing to a predetermined relationship to the anticipated final position of the control rod drive housing;

providing welding implements transversely rotatably mounted interior of the welding cylinder relative to said alignment device such that the welding implements may be accurately positioned for dispensing weldment around the periphery of the top of the stub tube and at the side of the control rod drive housing;

measuring the elevation and angularity of said control rod drive housing; and dispensing weldment along the top of the stub tube and at the side of the control rod drive housing.

2. The process of claim 1 and including the step of monitoring the elevation and angularity of the top of the control rod drive housing during said dispensing step.

* * * * *